(12) United States Patent
Gogotsi

(10) Patent No.: US 7,744,843 B2
(45) Date of Patent: Jun. 29, 2010

(54) METHODS FOR BULK SYNTHESIS OF CARBON NANOTUBES

(75) Inventor: Yury Gogotsi, Ivyland, PA (US)

(73) Assignee: Drexel University, Philadelphia, PA (US)

( * ) Notice: Subject to any disclaimer, the term of this patent is extended or adjusted under 35 U.S.C. 154(b) by 576 days.

(21) Appl. No.: 11/571,104

(22) PCT Filed: Jun. 15, 2005

(86) PCT No.: PCT/US2005/021017

§ 371 (c)(1),
(2), (4) Date: Jun. 20, 2007

(87) PCT Pub. No.: WO2006/127017

PCT Pub. Date: Nov. 30, 2006

(65) Prior Publication Data

US 2008/0219913 A1    Sep. 11, 2008

Related U.S. Application Data

(60) Provisional application No. 60/581,411, filed on Jun. 21, 2004.

(51) Int. Cl.
*D01F 9/12* (2006.01)
*B82B 3/00* (2006.01)
(52) U.S. Cl. .................... 423/447.1; 977/842
(58) Field of Classification Search ............. 423/447.1; 977/842
See application file for complete search history.

(56) References Cited

U.S. PATENT DOCUMENTS

| 6,303,094 B1 | 10/2001 | Kusunoki et al. ............. 95/116 |
| 6,730,972 B2 | 5/2004 | Ravi et al. .................. 257/379 |

FOREIGN PATENT DOCUMENTS

| WO | WO 01/16023 A1 | 3/2001 |
| WO | WO 2006/127017 A3 | 11/2006 |
| WO | WO2006/127017 A3 | 11/2006 |

OTHER PUBLICATIONS

Dresselhaus, M.S., et al., "Raman scattering in carbon materials," in *Analytical Applications of Raman Spectroscopy*, Pelletier, M. (Ed.), Blackwell Science, Chapter 9, 1999, 367-434.

Ersoy, D.A., et al., "Tribological properties of carbon coatings produced by high temperature chlorination of silicon carbide," STLE Tribology Transactions, 2000, 43(4), 809-815.

Ersoy, D.A., et al., "Platinum reactions with carbon coatings produced by high temperature chlorination of silicon carbide," in *High Temperature Corrosion and Materials Chemistry*, McNallan, M., et al. (Eds.), The Electrochemical Society Proceedings, 1999, vol. 99-38, 456-467.

Fang, S.L., et al., "Raman scattering study of coalesced single wall carbon nanotubes," J. of Material Research, 1998, 13(9), 2405-2411.

Fedorov, N.F., et al., "Theoretical foundations of carbide-thermal technology for production of activated carbon and sorption-active materials," Russ. J. Appl. Chem., Translated from Zhurmal Prikladnoi Khimii, 1998, 71(4), 601-603.

Fedorov, N.F., et al., "Production, pore structure, adsorption properties and fields of application of composite sorbents from calcium carbide," Russ. J. Appl. Chem., Translated from Zhurmal Prikladnoi Khimii, 1998, 71(5), 795-798.

Fedorov, N.F., "Untraditional solutions in chemical technology of carbon adsorbents," Russian Chemical Journal, 1995, 39, 73-83 (No English abstract).

Gogotsi, Y.G., et al., "Carbon coatings on silicon carbide by reaction with chlorine- containing gases," J. Mater. Chem., 1997, 7, 1841-1848.

Gogotsi, Y.G., et al., "Formation of carbon films on carbides under hydrothermal conditions," Nature, 1994, 367, 628-630.

Gogotsi, Y.G., et al., "Conversion of silicon carbide to crystalline diamond- structured carbon at ambient pressure," Nature, 2001, 411, 283-287.

Gogotsi, Y.G., "Nanostructured carbon coatings," in *Proc. NATO ARW on Nanostructured Films and Coatings*, Chow, G.-M., et al. (Eds,), 1999, 25-40.

Gogotsi, Y.G., "Formation of carbon coatings on carbide fibers and particles by disproportionation reactions," in *NATO ARW: Advanced Multilayered and Fiber-Reinforced Composites*, Haddad, Y.M. (Ed.), 1997, 217-230.

Gogotsi, Y., et al., "Graphite polyhedral crystals," Science, 2000, 290, 317-320.

Gogotsi, Y., et al., "In-situ multi-phase fluid experiments in hydrothermal carbon nanotubes," Applied Physics Letters, 2001, 79, 1021-1023.

(Continued)

*Primary Examiner*—Stuart Hendrickson
(74) *Attorney, Agent, or Firm*—Woodcock Washburn LLP

(57) ABSTRACT

Methods for synthesizing single-wall carbon nanotubes by extracting metals from a carbide by halogen treatment at a temperature ranging between 700 to 1700° C. at ambient or low pressure are provided.

34 Claims, No Drawings

OTHER PUBLICATIONS

Gogotsi, Y., et al., "Hydrothermal synthesis of multiwall carbon nanotubes," J. Mater. Res., 2000, 15, 2591-2594.

Gogotsi, Y., et al., "Transformation of diamond to graphite," Nature, 1999, 401, 663-664.

Gordeev, S.K, et al., "New approach to microporous block material production," translated from Zh. Prikl. Khimii, Central Scientific-Research Institute of Materials, St. Petersburg, Russ. J. of Applied Chemistry, 1994, 67(8), Part 2, 1210-1212.

Gunster, J., et al., "Well-defined nanostructure nucleation sites provided by the faceted TiC (111) surface," Appl. Phys. Lett., 2000, 77(20), 3173-3175.

Hafner, J.H., et al., "Catalytic growth of single-wall carbon nanotubes from metal particles," Chem. Phys. Lett., 1998, 195-202.

Harris, P.J.F., Carbon Nanotubes and Related Structures (Cambridge University Press), 1999, 20-55.

Iijima, S., "Carbon nanotubes," MRS Bull., 1994, 19, 43-49.

Jacob, M., et al., "Bulk synthesis of nanotube-like carbon material," in *Amorphous and Nanoporous Carbon*, Mat. Soc. Symp. Proc. Sullivan, et al. (Eds.), Materials Research Society, 2000, 593, 87-92.

Jacobson, N. S., et al., "Thermodynamic and experimental study of carbon formation on carbides under hydrothermal conditions," J. Mater. Chem., 1995, 5(4), 595-601.

Journet, C., et al., "Large-scale production of single-walled carbon nanotubes by the electric-arc technique," Nature, 1997, 388, 756-758.

Kusunoki, M., et al., "Epitaxial carbon nanotube film self-organized by decomposition of silicon carbide," Appl. Phys. Lett., 1997, 71, 2620-2622.

Kusunoki, M., et al., "A formation of self-aligned carbon nanotube films by surface decomposition of silicon carbide," Phil. Mag. Lett., 1999, 79(4), 153-161.

Kusunoki, M., et al., "Aligned carbon nanotube film self-organized on a SiC wafer," Jpn. J. Appl. Phys., 1998, 37, L605-L606.

Kusunoki, M., et al., "A formation mechanism of carbon nanotube films on SiC(0001)," Appl. Phys. Lett., 2000, 77, 531-533.

Libera, J., et al., "Hydrothermal synthesis of graphite tubes using Ni catalyst," Carbon, 2001, 39, 1307-1318.

Motzfeldt, K., et al., "Transport process in the thermal decomposition of silicon carbide," in *Proceedings of the Ninth International Conference on High Temperature Materials Chemistry*, Electrochemical Soc. Proceedings, Spear, K.E. (Ed), 1997, 523-528.

Obraztsova, E.D., et al., "Raman identification of onion-like carbon," Carbon, 1998, 36(5-6), 821-826.

Primenta, M.A., et al., "Resonant raman effect in single-wall carbon nanotubes," J. of Material Research, 1998, 13(9), 2396-2404.

Rao, A.M., "Diameter-selective raman scattering from vibrational modes in carbon nanotubes," Science, 1997, 275, 187-191.

Rao, A.M., et al., "Evidence for charge transfer in doped carbon nanotube bundles from roman scattering," Nature, 1997, 388, 257-259.

Schlittler, R.R., et al., "Single crystals of single-walled carbon nanotubes formed by self-assembly," Science, 2001, 292, 1136-1139.

Suchanek, W.L., et al., "Stability of fullerenes under hydrothermal conditions," J. Mater. Res., 1999, 14(2), 323-326.

Thess, A., et al., "Crystalline ropes of metallic carbon nanotubes," Science, 1996, 273, 483-487.

Tsugawa, K., et al., "Carbon nanotubes and carbon nanofibers synthesized by sublimating decomposition of silicon carbide with catalysts," Proceeding of the Sixth Applied Diamond Conference/Second Frontier Carbon Technology Joint Conference, NASA/CP, 2001, 800-804.

Yumura, M., "Synthesis and purification of multi-walled and single-walled carbon nanotubes," in *The Science and Technology of Carbon Nanotubes*, Tanka, K., et al. (Eds.), Elsevier, Amsterdam, 1999, 2-13.

Zheng, J., et al., "Carbon with an onion-like structure obtained by chlorinating titanium carbide," J. Mater. Chem., 2000, 10, 1039-1041.

Dresselhaus, M.S., et al., "Raman scattering in carbon materials," in *Analytical Applications of Raman Spectroscopy*, Pelletier, M. (Ed.), Blackwell Science, Chapter 9, no month 1999, 367-434.

Ersoy, D.A., et al., "Tribological properties of carbon coatings produced by high temperature chlorination of silicon carbide," STLE Tribology Transactions, Oct. 2000, 43(4), 809-815.

Ersoy, D.A., et al., "Platinum reactions with carbon coatings produced by high temperature chlorination of silicon carbide," in *High Temperature Corrosion and Materials Chemistry*, McNallan, M., et al. (Eds.), The Electrochemical Society Proceedings, no month 1999, vol. 99-38, 456-467.

Fang, S.L., et al., "Raman scattering study of coalesced single wall carbon nanotubes," J. of Material Research, Sep. 1998, 13(9), 2405-2411.

Fedorov, N.F., et al., "Theoretical foundations of carbide-thermal technology for production of activated carbon and sorption-active materials," Russ. J. Appl. Chem., Translated from Zhurmal Prikladnoi Khimii, no month 1998, 71(4), 601-603.

Fedorov, N.F., et al., "Production, pore structure, adsorption properties and fields of application of composite sorbents from calcium carbide," Russ. J. Appl. Chem., Translated from Zhurmal Prikladnoi Khimii, no month 1998, 71(5), 795-798.

Fedorov, N.F., "Untraditional solutions in chemical technology of carbon adsorbents," Russian Chemical Journal, no. month 1995, 39, 73-83 (No English abstract).

Gogotsi, Y.G., et al., "Carbon coatings on silicon carbide by reaction with chlorine-containing gases," J. Mater. Chem., no month 1997, 7, 1841-1848.

Gogotsi, Y.G., et al., "Formation of carbon films on carbides under hydrothermal conditions," Nature, Feb. 1994, 367, 628-630.

Gogotsi, Y.G., et al., "Conversion of silicon carbide to crystalline diamond-structured carbon at ambient pressure," Nature, May 2001, 411, 283-287.

Gogotsi, Y.G., "Nanostructured carbon coatings," in *Proc. NATO ARW on Nanostructured Films and Coatings*, Chow, G.-M., et al. (Eds,), Jun. 1999, 25-40.

Gogotsi, Y.G., "Formation of carbon coatings on carbide fibers and particles by disproportionation reactions," in *NATO ARW: Advanced Multilayered and Fiber-Reinforced Composites*, Haddad, Y.M. (Ed.), no month 1997, 217-230.

Gogotsi, Y., et al., "Graphite polyhedral crystals," Science, Oct. 2000, 290, 317-320.

Gogotsi, Y., et al., "In-situ multi-phase fluid experiments in hydrothermal carbon nanotubes," Applied Physics Letters, Aug. 2001, 79, 1021-1023.

Gogotsi, Y., et al., "Hydrothermal synthesis of multiwall carbon nanotubes," J. Mater. Res., Dec. 2000, 15, 2591-2594.

Gogotsi, Y., et al., "Transformation of diamond to graphite," Nature, Oct. 1999, 401, 663-664.

Gordeev, S.K, et al., "New approach to microporous block material production," translated from Zh. Prikl. Khimii, Central Scientific-Research Institute of Materials, St. Petersburg, Russ. J. of Applied Chemistry, no month 1994, 67(8), Part 2, 1210-1212.

Gunster, J., et al., "Well-defined nanostructure nucleation sites provided by the faceted TiC (111) surface," Appl. Phys. Lett., Nov. 2000, 77(20), 3173-3175.

Hafner, J.H., et al., "Catalytic growth of single-wall carbon nanotubes from metal particles," Chem. Phys. Lett., Oct. 1998, 195-202.

Harris, P.J.F., Carbon Nanotubes and Related Structures (Cambridge University Press), no month 1999, 20-55.

Iijima, S., "Carbon nanotubes," MRS Bull., Nov. 1994, 19, 43-49.

Jacob, M., et al., "Bulk synthesis of nanotube-like carbon material," in *Amorphous and Nanoporous Carbon*, Mat. Soc. Symp. Proc. Sullivan, et al. (Eds.), Materials Research Society, no month 2000, 593, 87-92.

Jacobson, N.S., et al., "Thermodynamic and experimental study of carbon formation on carbides under hydrothermal conditions," J. Mater. Chem., no month 1995, 5(4), 595-601.

Journet, C., et al., "Large-scale production of single-walled carbon nanotubes by the electric-arc technique," Nature, Aug. 1997, 388, 756-758.

Kusunoki, M., et al., "Epitaxial carbon nanotube film self-organized by decomposition of silicon carbide," Appl. Phys. Lett., Nov. 1997, 71, 2620-2622.

Kusunoki, M., et al., "Formation of self-aligned carbon nanotube films by surface decomposition of silicon carbide," Phil. Mag. Lett., no month 1999, 79(4), 153-161.

Kusunoki, M., et al., "Aligned carbon nanotube film self-organized on a SiC wafer," Jpn. J. Appl. Phys., May 1998, 37, L605-L606.

Kusunoki, M., et al., "A formation mechanism of carbon nanotube films on SiC(0001)," Appl. Phys. Lett., Jul. 2000, 77, 531-533.

Libera, J., et al., "Hydrothermal synthesis of graphite tubes using Ni catalyst," Carbon, no month 2001, 39, 1307-1318.

Motzfeldt, K., et al., "Transport process in the thermal decomposition of silicon carbide," in *Proceedings of the Ninth International Conference on High Temperature Materials Chemistry*, Electrochemical Soc. Proceedings, Spear, K.E. (Ed), no month 1997, 523-528.

Obraztsova, E.D., et al., "Raman identification of onion-like carbon," Carbon, no month 1998, 36(5-6), 821-826.

Pimenta, M.A., et al., "Resonant raman effect in single-wall carbon nanotubes," J. of Material Research, Sep. 1998, 13(9), 2396-2404.

Rao, A.M., "Diameter-selective raman scattering from vibrational modes in carbon nanotubes," Science, Jan. 1997, 275, 187-191.

Rao, A.M., et al., "Evidence for charge transfer in doped carbon nanotube bundles from roman scattering," Nature, Jul. 1997, 388, 257-259.

Schlittler, R.R., et al., "Single crystals of single-walled carbon nanotubes formed by self-assembly," Science, May 2001, 292, 1136-1139.

Suchanek, W.L., et al., "Stability of fullerenes under hydrothermal conditions," J. Mater. Res., Feb. 1999, 14(2), 323-326.

Thess, A., et al., "Crystalline ropes of metallic carbon nanotubes," Science, Jul. 1996, 273, 483-487.

Tsugawa, K., et al., "Carbon nanotubes and carbon nanofibers synthesized by sublimating decomposition of silicon carbide with catalysts," Proceeding of the Sixth Applied Diamond Conference/Second Frontier Carbon Technology Joint Conference, NASA/CP, Aug. 2001, 800-804.

Yumura, M., "Synthesis and purification of multi-walled and single-walled carbon nanotubes," in *The Science and Technology of Carbon Nanotubes*, Tanka, K., et al. (Eds.), Elsevier, Amstredam, no month 1999, 2-13.

Zheng, J., et al., "Carbon with an onion-like structure obtained by chlorinating titanium carbide," J. Mater. Chem., no month 2000, 10, 1039-1041.

METHODS FOR BULK SYNTHESIS OF CARBON NANOTUBES

CROSS-REFERENCE TO RELATED APPLICATIONS

This patent application claims the benefit of U.S. Provisional Pat. App. Ser. No. 60/581,411, filed Jun. 21, 2004, the entirety of which is incorporated by reference herein in its entirety. This patent application is also a 37 CFR 371 National Phase application of PCT/US2005/021017, filed Jun. 15, 2005, the entirety of which is incorporated by reference herein.

This work was supported in part by the Office of Naval Research (Grant No. N00014-01-1-0762) and the U.S. Government has certain rights in this invention.

FIELD OF THE INVENTION

Methods for synthesizing single-wall carbon nanotubes are provided wherein carbides other than aluminum carbide are dissociated and metals are extracted from the dissociated carbides by halogen treatment in a temperature range of 700-1700° C. under low to ambient pressures.

BACKGROUND OF THE INVENTION

Research on single-wall carbon nanotubes (SWNTs) was put forth by Iijima (MRS Bull 1994 19:43-49). The structure of a SWNT consists of an enrolled graphene that forms a seamless cylinder. Several potential applications of SWNTs require large amounts of material. For these to be practical, a low-cost, scalable continuous manufacturing process is required.

SWNTs can be produced by the methods similar to the ones used in multi-wall nanotubes (MWNT) synthesis, but in much smaller quantities and with lower yields.

Traditionally, carbon arc synthesis (Journet. et al. 1997 Nature 756) or pulsed laser vaporization of carbon (Thess et al. Science 1996 273:483-487) in the presence of a metal catalyst (which is always required for SWNT synthesis) has been used. More recently, chemical vapor deposition (CVD) of benzene with a Fe catalyst was used to produce small amounts of SWNTs on substrates. Ni, Co and Fe work well as catalysts, but catalysts containing more than one element (e.g., Co—Pt or Ni—Y) increase the yield of SWNTs (Yumura, M. Synthesis and Purification of Multi-Walled and Single-Walled Carbon Nanotubes. in *The Science and Technology of Carbon Nanotubes* (eds. Tanaka, K., Yamabe, T. & Fukui, K.) 2-13 (Elsevier, Amsterdam, 1999)). Homogeneous catalytic decomposition of CO or HiPco (high pressure carbon monoxide) process was introduced in attempt to provide a continuous production method with a higher yield (Hafner et al. Chem. Phys. Lett. 1998 296). However, all of these techniques suffer from very low yields and lack of control over the tube size and chirality (Harris, P. J. F. *Carbon Nanotubes and Related Structures* (Cambridge University Press, Cambridge, 1999, 20-55). Large amounts of the catalyst trapped in the material and the presence of non-tubular carbon create additional difficulties, thus requiring the purification of nanotubes prior to use. Furthermore, the structure of individual tubes varies widely. Zigzag, armchair and chiral forms of various diameters coexist in the material.

Thus, there is a need for techniques for producing SWNTs in the amount and quality required for their industrial use.

Carbide-derived carbon (CDC) is produced in accordance with methods described by Gogotsi et al. (Nature 2001 411: 283-287; Nature 1994 367:628-630; and J. Mater. Chem. 1997 7:1841-1848). In this method metals are extracted from carbides using reactive gases at elevated temperatures. For example, the formation of carbide-derived carbon (CDC) resulting from the extraction of silicon from SiC at 300-800° C. by supercritical water has been disclosed (Gogotsi, Y. G. and Yoshimura, M. Nature 1994 367:628-630). Extraction of metals from carbides by halogens ($Cl_2$) or their compounds (HCl) has also been shown to lead to the formation of free carbon (Gogotsi et al. J. Mater. Chem. 1997 7:1841-1848). This method can be used to obtain carbon from SiC and other carbides that form volatile halides ($SiCl_4$ is a typical example). $SiCl_4$ is more thermodynamically stable than $CCl_4$ at elevated temperatures. Thus, chlorine reacts selectively with the Si at SiC surfaces leaving carbon behind:

$$SiC + 2Cl_2 = SiCl_4 + C \qquad (1)$$

$$SiC + \tfrac{3}{2}Cl_2 = SiCl_3 + C \qquad (2)$$

Similar carbon formation occurs upon chlorination of other carbides or high-temperature dissociation of SiC (Motzfeldt, K. and Steinmo, M. Transport Processes in the Thermal Decomposition of Silicon Carbide. in *Proceedings of The Ninth International Conference on High Temperature Materials Chemistry* (ed. Spear, K. E.) 523-528 (The Electrochemical Society, Inc., Pennington, N.J., USA, 1997)). This is a versatile technology because a variety of carbon structures can be obtained (Gogotsi, Y. Nanostructured Carbon Coatings. in *Proc. NATO ARW on Nanostructured Films and Coatings* (eds. Chow, G.-M., Ovid'ko, I. A. & Tsakalakos, T.) 25-40 (Kluwer, Dordrecht, 1999). Not only simple shapes, but also fibers, powders and components with complex shapes and surface morphologies can be coated with carbon, and bulk carbon materials or powders can be produced by a reaction through the whole thickness of the powder or a monolithic component. This technology allows for control of the coating growth on the atomic level, monolayer by monolayer, with high accuracy and controlled structures.

The structure and morphology of CDC depends on the temperature and composition of the chlorinating gas mixture. Carbon films have been produced on β-SiC powders (Gogotsi et al. J. Mater. Chem. 1997 7:1841-1848), as well as on SiC based fibers (Gogotsi, Y. G. Formation of Carbon Coatings on Carbide Fibers and Particles by Disproportionation Reactions. in *NATO ARW: Advanced Multilayered and Fiber-Reinforced Composites* (ed. Haddad, Y. M.) 217-230 (Kluwer, Dordrecht, 1997)), monolithic CVD, and sintered ceramics (Gogotsi et al. Nanostructured Carbon Coatings on Silicon Carbide: Experimental and Theoretical Study. in *Proc. NATO ASI on Functional Gradient Materials and Surface Layers Prepared by Fine Particles Technology* (eds. Baraton, M. I. & Uvarova, I. V.) (Kluwer, Dordrecht, 2000)) exposed to Ar—$H_2$—$Cl_2$ gas mixtures at atmospheric pressure and temperatures between 600° C. and 1000° C. Carbon films with a thickness up to 200 μm have been formed as well on the surfaces of commercially available monolithic SiC specimens by high temperature chlorination at atmospheric pressure in Ar—$Cl_2$ and Ar—$H_2$—$Cl_2$ gas mixtures (Ersoy et al. STLE Tribology Transactions 2000 43:809-815). The complete transformation of carbide powders to carbon has also been demonstrated (Gogotsi et al. J. Mater. Chem. 1997 7:1841-1848; Fedorov, N. F. and Samonin, V. V. Russ. J. Appl. Chem. 1998 71:584-588; Fedorov, N. F. and Samonin, V. V. Russ. J. Appl. Chem. 1998 71:795-798; Fedorov, N. F. Russian Chemical Journal 1995 39:73-83; Gordeev, S. K. and Vartanova, A. V. Zh. Prikl. Khimii 1994 67:1375-1377). TiC, $B_4C$, $Al_4C_3$, TaC, and other carbides can also be transformed to carbon (Jacobson et al. J. Mater. Chem. 1995 5:595-601).

Closed-shell carbon structures such as multiwall nanotubes and carbon onions have been identified on the surface of CDC coatings produced by chlorination of SiC at about 1000° C. (Gogotsi et al. Nanostructured Carbon Coatings on Silicon Carbide: Experimental and Theoretical Study. in *Proc. NATO ASI on Functional Gradient Materials and Surface Layers Prepared by Fine Particles Technology* (eds. Baraton, M. I. & Uvarova, I. V.) (Kluwer, Dordrecht, 2000); Zheng et al. J. Mater. Chem. 2000 10:1039-1041; Jacob et al. In Amorphous and Nanoporous Carbon. Mat. Res. Soc. Symp. Proc. edited by Sullivan et al. Materials Research Society, Warrendale, Pa. (2000), Vol. 593, p 87). Nanotube-like and onion-like materials consisting of close-shell structures have been commercialized by Skeleton Technologies, Sweden, under the trade name Skeleton-C®. Production of these materials is performed at or below 1000° C. and no tube alignment occurs.

Aligned MWNTs have been produced at Japan Fine Ceramics Center by the thermal decomposition of SiC crystals in a vacuum (Kusunoki et al. Appl. Phys. Lett. 1997 71:2620-2622; Kusunoki et al. Phil. Mag. Lett. 1999 79:153-161). Similar experiments conducted at higher temperatures ranging from 1600 to 1750° C. on different SiC substrates produced very thin (2-5 nm in diameter) nanotubes including double-wall nanotubes and SWNTs, which had hemispherical fullerene-like caps (Kusunoki et al. Jpn. J. Appl. Phys. 1998 37:L605-L606). In these experiments, nanotube coatings on single crystals and powders, as well as free-standing nanotube films were produced. Further, reproducible synthesis of nanotubes using $SiC^{28,29}$ or $TiC^{30}$ as a precursor and carbon source was shown.

WO 01/16023 discloses a method for production of nanoporous nanotube-like carbon in large quantities involving halogenation of aluminum carbide at a temperature above 450° C. and preferably from about 500 to 850° C.

SUMMARY OF THE INVENTION

An object of the present invention is to provide a method for synthesizing single-wall carbon nanotubes which comprises extracting metals from a carbide by halogen treatment at a temperature ranging between 700 to 1700° C. at ambient or low pressure.

Another object of the present invention is to provide single-wall carbon nanotubes produced by extracting metals from a carbide by halogen treatment at a temperature ranging between 700 to 1700° C. at ambient or low pressure.

DETAILED DESCRIPTION OF THE INVENTION

Multiwall and single-wall carbon nanotubes have a great potential for future technologies. However, current manufacturing processes produce tiny amounts of material. It has now been found that carbon nanotubes can be formed in reactions with carbide powders such as SiC powder and bulk materials. More specifically, it has been found that single-wall nanotubes can be synthesized by the dissociation of carbides and extraction of metals from carbides by halogens and their compounds in the temperature range of 700-1700° C. at ambient and low pressures. Accordingly, the present invention provides a method for the bulk synthesis of carbon nanotubes from metal carbides. In this method nanotube nucleation and growth occur upon the conversion of carbides into carbon. Thus nanotube growth is self-catalytic. Using this method, bulk nanotubes (powders), free-standing nanotube films and thin layers of carbon nanotubes can be grown on SiC single crystals, polycrystalline carbide ceramics and particulate substrates.

In contrast to many of the low yielding SWNT synthetic methods described previously, in the method of the present invention the carbide dissociation technique is performed under equilibrium. The synthesis under equilibrium conditions has intrinsic merits, including large volume synthesis.

In the method of the present invention, metals are extracted from carbides in the temperature range of 700-1700° C. at ambient and low pressures for SWNTs synthesis. Examples of carbides useful in the methods of the present invention include, but are not limited to, SiC, TiC, $B_4C$, ZrC, $YC_2$ and $Fe_3C$. Aluminum carbides are not used in the present invention.

In this method, extraction of the metal from the carbide sample is performed by subjecting the carbide sample to flow of a halogen, preferably chlorine or chlorine mixed with an inert gas such as argon, which is acting as a carrier gas, in a quartz or mullite lined furnace at ambient or lower pressure. Thermodynamic calculations are indicative of hydrogen chloride, bromine, iodine and other halogens and halogen-containing compounds being useful in producing carbon by the selective etching (extraction of metal) of carbides. The concentration of halogen in the environment may vary from 100% to 0.01% and will determine the growth rate of the carbon layer. The halogen is added at the synthesis temperature. The sample is heated to the synthesis temperature in the inert gas such as an argon environment, and a halogen such as chlorine is introduced when the desired temperature has been reached in the furnace. Selection of a halogen for this extraction step may depend upon the carbide selected. For example, iodine is believed to be particularly beneficial for the synthesis of nanotubes from TiC or ZrC, so that very pure titanium or zirconium metal can be produced as a byproduct of the process (Kusunoki et al. Appl. Phys. Lett. 2000 77:531-533).

The extraction of metal from carbide produces a porous carbon layer without any volume change. Since carbon atoms must fill the volume that was previously occupied by carbon and metal, it has now been found that the formation of low-density carbon structures occurs if the temperature is raised sufficiently for self-assembly. Thus, following extraction of the metal from the carbide, increasing the temperature to a range of 700° C. to 1700° C. leads to the one-dimensional growth of a tubular carbon structure. Tube diameter is controlled by the lattice parameter of the carbide substrate, carbide crystal orientation and the size of metal halogenide molecules, formed as a result of interaction between the metal of carbide and the extracting halogen gas, that escape through the tube. Below approximately 800° C., when carbon atoms have a low mobility, disordered carbon is formed. At higher temperatures (800-1700° C.), various ordered carbon structures ranging from graphite to diamond and nanotubes can be produced. When the temperature is increased above 2000° C., the diffusion rate becomes sufficient to produce graphite, which is the thermodynamically stable allotrope of carbon under ambient pressure.

Addition of a secondary catalyst to carbide samples to produce SWNT crystals is not required in the present invention. Instead, metal impurities present in ppm amounts in the carbide are sufficient to catalyze the nanotube growth. Thus, in one embodiment, this method is self-catalytic. It is expected that the self-catalytic synthesis of the present invention will be particularly efficient for $Fe_3C$, $YC_2$ and other carbides that show high catalytic activity for nanotube growth in the conventional gas phase and plasma synthesis. It is important in this method, however, that all metal be removed as volatile chloride (or other halogenide, depending on the halogen used) after tube formation during the synthesis process. Thus, catalyst-free nanotubes will be ultimately produced.

In some embodiments of the present invention, a secondary catalyst is added. It was recently shown that nanotubes on SiC can be formed at 1200° C. in the presence of PtPd catalyst, while the process requires above 1500° C. without a catalyst. In the method of the present invention, a continual supply of a secondary catalyst such as platinum (Pt) can be supplied through the gas phase to the surface of the growing carbon film on SiC. In this technique, a small amount of platinum is deposited within the growing carbon (nanotube) layer by gas transport reactions and this Pt catalyst layer moves to the SiC/carbon interface following the propagation of the reaction front. This secondary metal catalyst is also removed by halogens in the synthesis process leaving a catalyst-free product. This method differs from known methods in that the catalyst is supplied via the gas phase and the halogen treatment, such as chlorination, decreases the nanotube growth temperature.

Using the method of the present invention, single-wall tubes ranging in size from about 0.7 to 1.7 nm were produced by treating the carbide SiC in halogens with hydrogen added to the gas mixture. Excellent alignment of tubes forming a low-dimensional crystal-type structure was observed. Each crystal was composed of an ordered array of tubes with identical diameters. The 0.7-nm tubes are expected to be capped with a half of $C_{60}$ fullerene. These results are indicative of the method of the present invention being useful in the synthesis of bulk, highly aligned, crystalline SWNTs under equilibrium conditions.

As will be understood by those skilled in the art upon reading this disclosure, the structure and properties of carbon nanotubes obtained from carbides depend on the synthesis parameters. Process variables controlling the growth rate, yield, chirality, diameter and length of the tubes include temperature, gas composition, carbide precursor, and catalyst. By changing these process variables formation of single versus multi-wall nanotubes, chirality and diameter of the tubules can be controlled.

For example, by using different carbide precursors, the density of the produced carbon can be tuned in a wide range that is determined by the differences in the lattice parameters (distance between carbon atoms) and carbon content in the carbide structure (compare SiC, $B_4C$, $Fe_3C$ and $YC_2$). This assists in control of the tube diameter. Thus, SiC, where the relative content of carbon is high, forms small-diameter nanotubes. A loose carbon structure formed by using $B_4C$ or $Fe_3C$ (3-4 metal atoms removed per carbon atom) is expected to yield larger SWNT diameters to fill the entire volume.

The orientation of the tubes can also be controlled by the crystallographic orientation of the carbide substrate. For example, it has been shown that while nanotubes grow on the C-terminated (0001) surface of 4H or 6H hexagonal SiC, or (111) surface of 3C cubic SiC, planar graphite forms on the Si-terminated surfaces (Kusunoki et al. Appl. Phys. Lett. 2000 77:531-533). Thus, structural templating is possible and particularly important for nanotube nucleation.

The conversion of carbides such as SiC, TiC, $B_4C$, and $Fe_3C$ to nanotubes via the method of the present invention provides a low-cost process that, unlike all current methods, can be scaled to virtually any volume. Therefore, it has an enormous potential as a method for the controlled synthesis of large quantities of SWNTs for a variety of applications.

Commercial applications for the SWNTs produced in accordance with the methods of the present invention include, but are in no way limited to supercapacitors, in which nanotubes provide a combination of high electrical conductivity and high surface area; field emitters, which require ordered arrays of nanotubes; and additives to plastics and rubbers that improve their electrical and thermal conductivity.

What is claimed:

1. A method for synthesizing single-wall carbon nanotubes comprising extracting metals from a carbide by halogen treatment at a temperature ranging between 700 to 1700° C. at ambient or low pressure.

2. The method of claim 1 wherein the carbide does not comprise aluminum.

3. The method of claim 1 wherein the carbide is a SiC.

4. The method of claim 1 further comprising adding a platinum catalyst to the carbide during halogen treatment.

5. A method for synthesizing carbon nanotubes, comprising:
   extracting metal from a carbide substrate using one or more halogens at a temperature in the range of from about 700° C. to about 2000° C.; and
   growing carbon nanotubes in a non-vacuum pressure environment on the substrate upon conversion of the carbide substrate into carbon.

6. The method of claim 5, wherein the carbide substrate comprises a metal carbide.

7. The method of claim 5, wherein the metal carbide comprises SiC, TiC, $B_4C$, ZrC, $YC_2$, $Fe_3C$, or any combination thereof.

8. The method of claim 5, wherein the halogen comprises $Cl_2$, HCl, $Br_2$, $I_2$, HBr, HI, or any combination thereof.

9. The method of claim 5, wherein the concentration of the halogen in the non-vacuum pressure environment is in the range of from about 0.01% to about 100%.

10. The method of claim 5, wherein the metal comprises Si, Ti, B, Zr, Y, Fe, or any combination thereof.

11. The method of claim 5, wherein the metal is dissociated from the carbide substrate under equilibrium.

12. The method of claim 5, wherein the metal carbide does not include aluminum.

13. The method of claim 5, wherein the metal does not include aluminum.

14. The method of claim 5, wherein extraction of the metal from the carbide substrate is performed by subjecting the carbide substrate to a flow of halogen.

15. The method of claim 14, wherein the flow of halogen further comprises an inert carrier gas.

16. The method of claim 5, wherein the substrate is heated to a temperature in the range of from about 700° C. to about 2000° C. in an inert gas environment, and the halogen is introduced to the inert gas environment when the temperature is reached.

17. The method of claim 5, wherein the carbide substrate comprises TiC or ZrC, and the halogen comprises iodine.

18. The method of claim 5, wherein the step of extracting metal gives rise to a porous carbon layer on the carbide substrate.

19. The method of claim 18, wherein formation of the porous carbon layer gives rise to one-dimensional growth of the carbon nanotubes.

20. The method of claim 19, wherein carbon nanotubes grow at a temperature in the range of from 800° C. to 2000° C.

21. The method of claim 20, wherein the carbon nanotubes grow at a temperature in the range of from 800° C. to 1700° C.

22. The method of claim 21, wherein the carbon nanotubes comprise single-wall carbon nanotubes.

23. The method of claim 20, wherein the carbon nanotubes grow at a temperature in the range of from 1700° C. to 2000° C.

24. The method of claim 21, wherein the carbon nanotubes comprise multi-wall carbon nanotubes.

25. The method of claim 5, wherein the carbide substrate comprises metal impurities in ppm amounts, the metal impurities capable of catalyzing the growth of the carbon nanotubes.

26. The method of claim 5, further comprising the step of removing all of the extracted metal.

27. The method of claim 5, wherein the method further comprises the presence of a secondary catalyst.

28. The method of claim 27, wherein the secondary catalyst comprises platinum, palladium, or any combination thereof.

29. The method of claim 27, wherein the secondary catalyst is supplied through the gas phase to the growing nanotubes.

30. The method of claim 27, wherein the secondary catalyst becomes positioned at the interface between the carbide substrate and the growing carbon nanotubes.

31. The method of claim 27, wherein the carbon nanotubes grow at a temperature of less than 1500° C.

32. The method of claim 5, wherein the growing carbon nanotubes gives rise to an ordered array of carbon nanotubes.

33. The method of claim 32, wherein the ordered array of carbon nanotubes comprise an ordered array of single-wall carbon nanotubes.

34. The method of claim 33, wherein each of the single-wall carbon nanotubes is characterized as ranging in size from about 0.7 nm to 1.7 nm.

* * * * *